US012580454B2

(12) United States Patent
McMahon

(10) Patent No.: US 12,580,454 B2
(45) Date of Patent: *Mar. 17, 2026

(54) METHOD OF DETERMINING RUNOUT

(71) Applicant: Waymo LLC, Mountain View, CA (US)

(72) Inventor: Morgan McMahon, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/416,489

(22) Filed: Jan. 18, 2024

(65) Prior Publication Data

US 2024/0186867 A1 Jun. 6, 2024

Related U.S. Application Data

(63) Continuation of application No. 17/125,613, filed on Dec. 17, 2020, now Pat. No. 11,923,728.

(51) Int. Cl.
 *H02K 11/215* (2016.01)
 *G01D 5/14* (2006.01)
 (Continued)

(52) U.S. Cl.
 CPC .......... *H02K 11/215* (2016.01); *G01D 5/145* (2013.01); *G01D 18/001* (2021.05); *H02K 11/33* (2016.01)

(58) Field of Classification Search
 CPC .............................. G01D 18/001; G01D 5/145
 See application file for complete search history.

(56) References Cited

U.S. PATENT DOCUMENTS 4,687,961 A 8/1987 Horber
4,810,967 A 3/1989 Konno et al.
 (Continued)

FOREIGN PATENT DOCUMENTS

CN 101790673 A 7/2010
CN 105403233 A 3/2016
 (Continued)

OTHER PUBLICATIONS

Alipour-Sarabi, Ramin et al., Performance Analysis of Concentrated Wound-Rotor Resolver for Its Applications in High Pole Number Permanent Magnet Motors, IEEE Sensors Journal, Dec. 1, 2017, 9 pgs., vol. 17, Issue 23.
 (Continued)

*Primary Examiner* — Noam Reisner
(74) *Attorney, Agent, or Firm* — McDonnell Boehnen Hulbert & Berghoff LLP

(57) ABSTRACT

A method for determining runout error includes generating a first magnetic field to interact with a second magnetic field generated by four or more poles of a magnet ring mounted to a first platform. The interaction may cause the first platform to rotate relative to a second platform. The method may further include receiving, from a magnetic field sensor, data including respective boundaries between neighboring poles of the four or more poles relative to a corresponding nominal boundary defined by substantially uniform boundary spacing. The method may include determining a magnetic field pattern from the data and, based on the pattern, determining an angular position of the four or more poles. The method may further include determining an angular difference between the determined angular position and a nominal angular position. The method may also include determining a runout error based on an amplitude of the angular difference.

20 Claims, 10 Drawing Sheets

(51) Int. Cl.
    *G01D 18/00*       (2006.01)
    *H02K 11/33*      (2016.01)

(56)           References Cited

U.S. PATENT DOCUMENTS

| | | |
|---|---|---|
| 5,347,190 A | 9/1994 | Lewis et al. |
| 6,158,286 A | 12/2000 | Nguyen et al. |
| 6,429,647 B1 | 8/2002 | Nicholson |
| 6,456,063 B1 | 9/2002 | Moreno et al. |
| 6,490,934 B2 | 12/2002 | Garshelis |
| 6,770,992 B2 | 8/2004 | Yamamoto et al. |
| 7,000,326 B2 | 2/2006 | Klarer |
| 7,282,878 B1 | 10/2007 | Shinano |
| 7,323,843 B2 | 1/2008 | Tu et al. |
| 7,834,618 B2 | 11/2010 | Moura et al. |
| 7,923,993 B2 | 4/2011 | Ueno et al. |
| 8,129,986 B2 | 3/2012 | May |
| 8,502,426 B2 | 8/2013 | Gandel et al. |
| 9,261,382 B2 | 2/2016 | Jiang et al. |
| 10,622,852 B2 | 4/2020 | Yamada et al. |
| 10,634,519 B2 | 4/2020 | Hainz |

| | | | | |
|---|---|---|---|---|
| 11,923,728 B2 * | 3/2024 | McMahon | ............. | G01D 5/145 |
| 2004/0212392 A1 | 10/2004 | Sader et al. | | |
| 2004/0239200 A1 | 12/2004 | Strahan | | |
| 2011/0025310 A1 | 2/2011 | Moura et al. | | |
| 2012/0105055 A1 | 5/2012 | Takahashi et al. | | |
| 2012/0283978 A1 | 11/2012 | Watanabe | | |
| 2018/0123412 A1 | 5/2018 | Karplus et al. | | |
| 2020/0136476 A1 | 4/2020 | Gassend et al. | | |
| 2020/0186060 A1 | 6/2020 | Brannen | | |

FOREIGN PATENT DOCUMENTS

| | | |
|---|---|---|
| CN | 109477735 A | 3/2019 |
| CN | 110463021 A | 11/2019 |
| EP | 3702790 A1 | 9/2020 |
| WO | 2011/057727 A1 | 5/2011 |

OTHER PUBLICATIONS

Guidan Li et al., An Orientation Measurement System of the Two-DOF Permanent Magnet Spherical Motor Based on Hall Ring Detectors, Measurement, Sep. 19, 2019, 9 pgs., vol. 150.

* cited by examiner

100
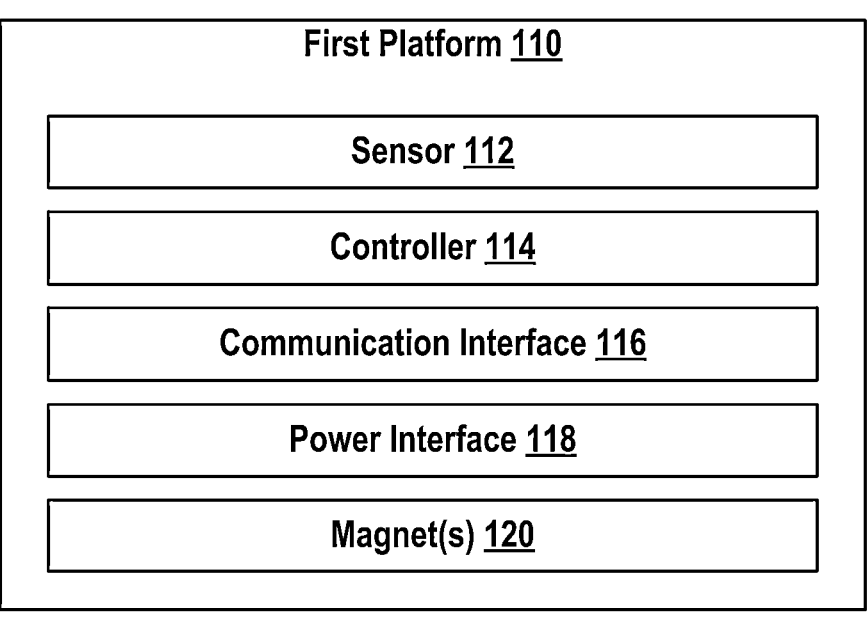
First Platform 110
Sensor 112
Controller 114
Communication Interface 116
Power Interface 118
Magnet(s) 120
102
104
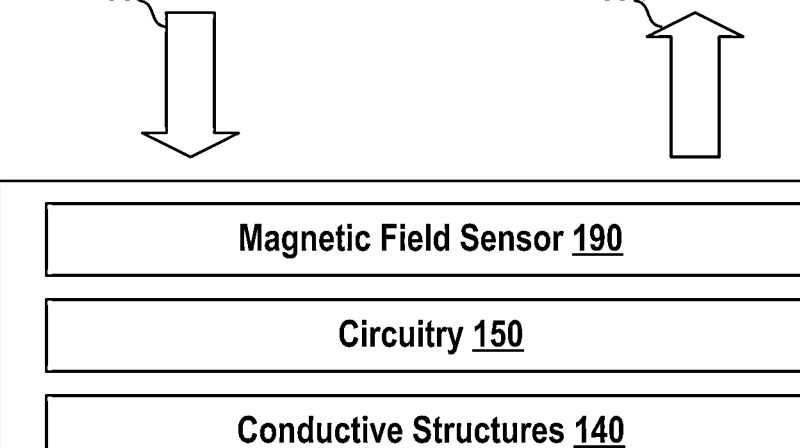
Magnetic Field Sensor 190
Circuitry 150
Conductive Structures 140
Power Interface 138
Communication Interface 136
Controller 134
Second Platform 130
Figure 1

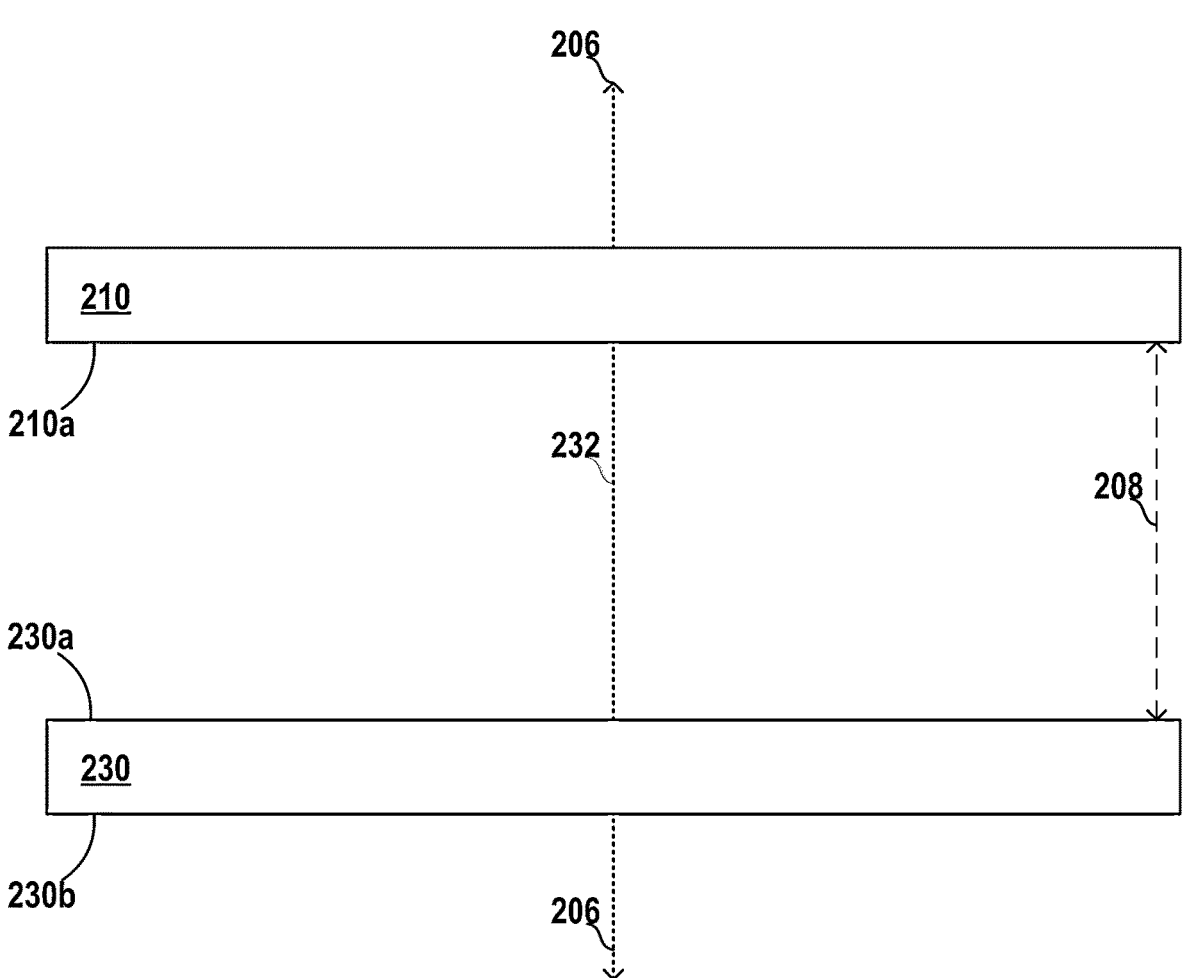
Figure 2

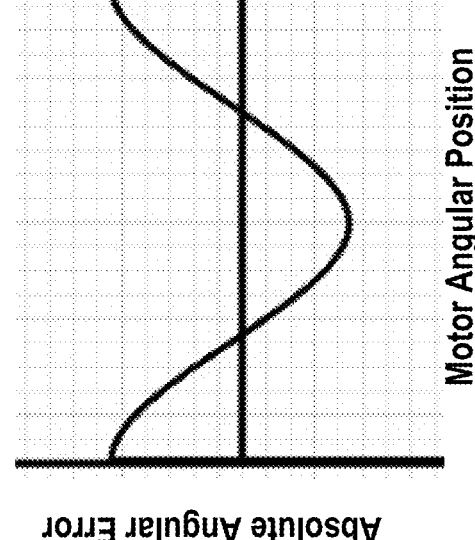
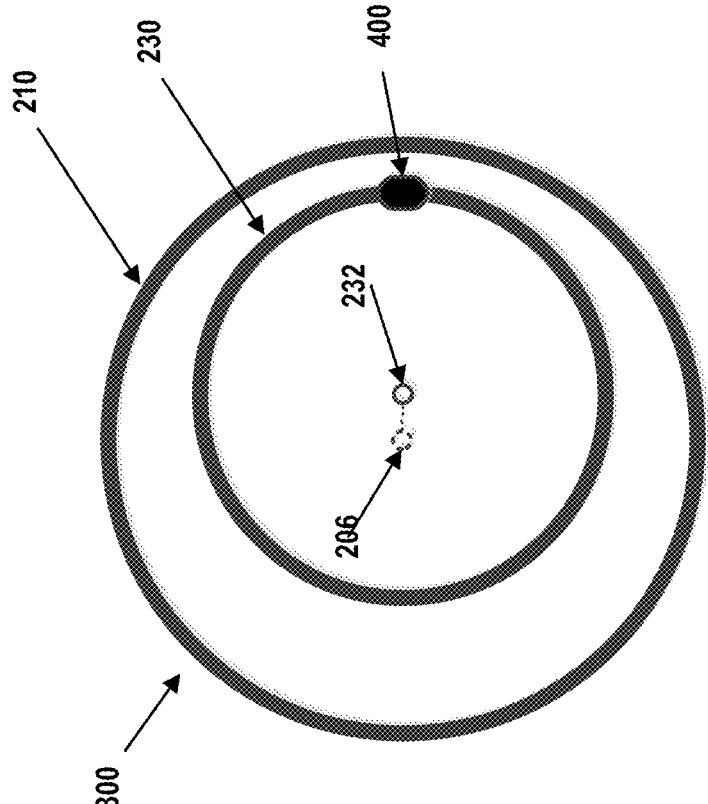
Figure 5A

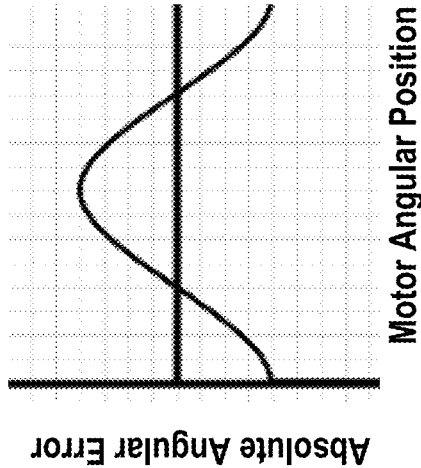
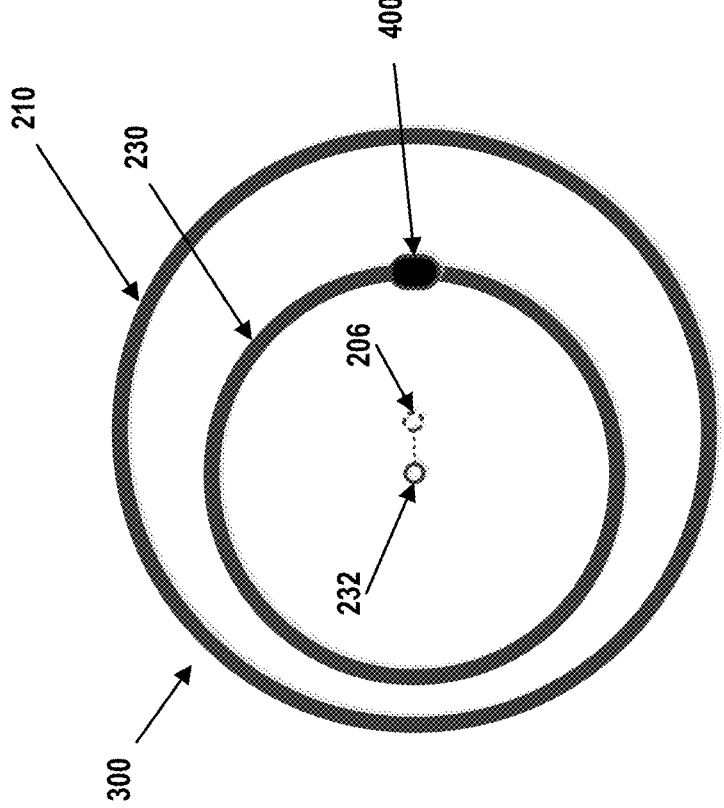
Figure 5B

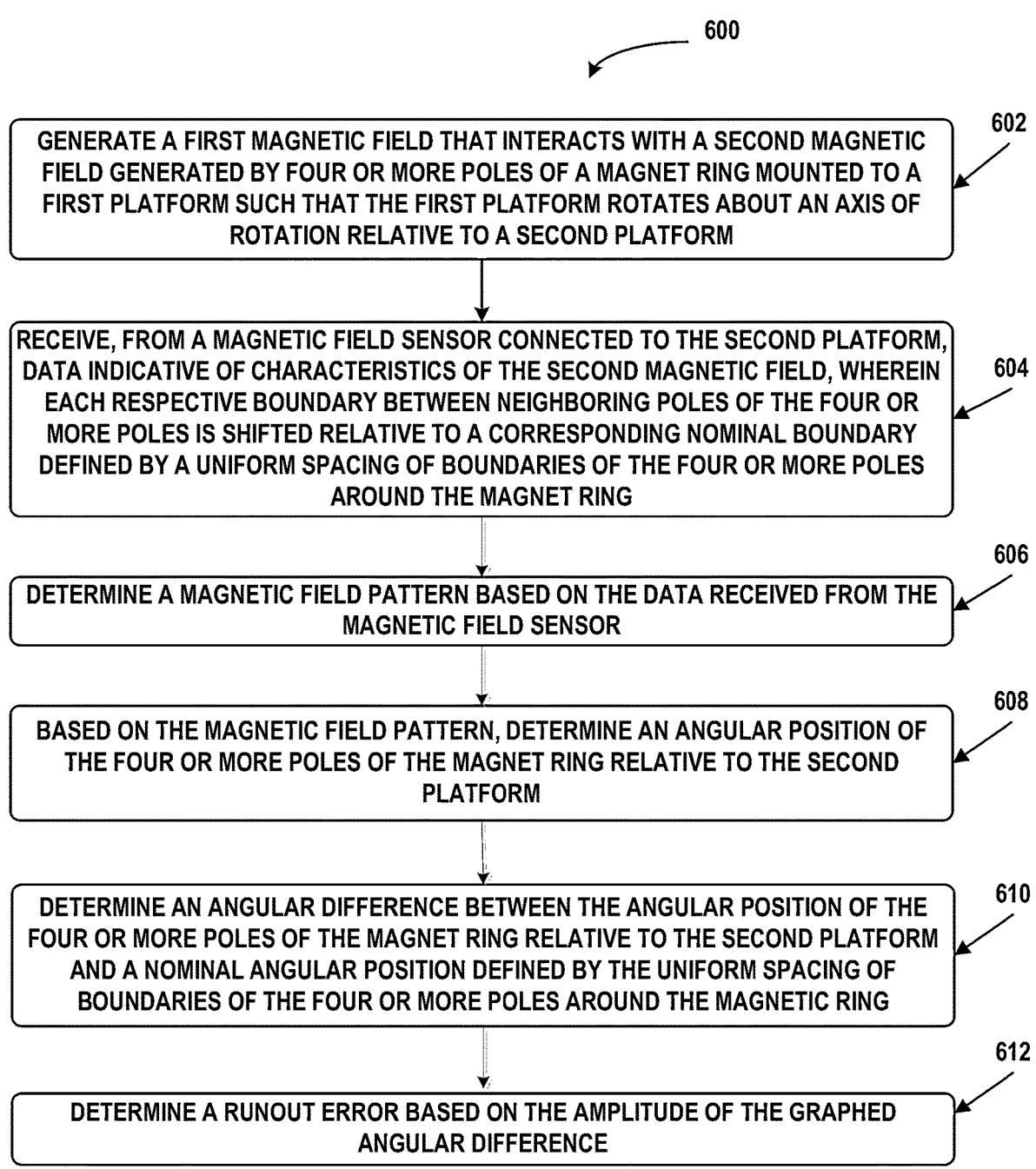

600

GENERATE A FIRST MAGNETIC FIELD THAT INTERACTS WITH A SECOND MAGNETIC FIELD GENERATED BY FOUR OR MORE POLES OF A MAGNET RING MOUNTED TO A FIRST PLATFORM SUCH THAT THE FIRST PLATFORM ROTATES ABOUT AN AXIS OF ROTATION RELATIVE TO A SECOND PLATFORM

602

RECEIVE, FROM A MAGNETIC FIELD SENSOR CONNECTED TO THE SECOND PLATFORM, DATA INDICATIVE OF CHARACTERISTICS OF THE SECOND MAGNETIC FIELD, WHEREIN EACH RESPECTIVE BOUNDARY BETWEEN NEIGHBORING POLES OF THE FOUR OR MORE POLES IS SHIFTED RELATIVE TO A CORRESPONDING NOMINAL BOUNDARY DEFINED BY A UNIFORM SPACING OF BOUNDARIES OF THE FOUR OR MORE POLES AROUND THE MAGNET RING

604

DETERMINE A MAGNETIC FIELD PATTERN BASED ON THE DATA RECEIVED FROM THE MAGNETIC FIELD SENSOR

606

BASED ON THE MAGNETIC FIELD PATTERN, DETERMINE AN ANGULAR POSITION OF THE FOUR OR MORE POLES OF THE MAGNET RING RELATIVE TO THE SECOND PLATFORM

608

DETERMINE AN ANGULAR DIFFERENCE BETWEEN THE ANGULAR POSITION OF THE FOUR OR MORE POLES OF THE MAGNET RING RELATIVE TO THE SECOND PLATFORM AND A NOMINAL ANGULAR POSITION DEFINED BY THE UNIFORM SPACING OF BOUNDARIES OF THE FOUR OR MORE POLES AROUND THE MAGNET RING

610

DETERMINE A RUNOUT ERROR BASED ON THE AMPLITUDE OF THE GRAPHED ANGULAR DIFFERENCE

METHOD OF DETERMINING RUNOUT

CROSS-REFERENCE TO RELATED APPLICATION

This application is a continuation of U.S. patent application Ser. No. 17/125,613, filed Dec. 17, 2020. This application is incorporated herein by reference in its entirety and for all purposes.

BACKGROUND

Rotary joint devices, such as rotary motors, are often used for transmission of power and/or electrical signals between one structure and another structure in an electromechanical system that operates by causing a relative rotation between the two structures (e.g., stator and rotor). Example systems that employ rotary joint devices include remote sensing systems (e.g., RADARs, LIDARs, etc.) and robotic systems (e.g., for directing microphones, speakers, robotic components, etc.), among others. Rotary joint devices may also include a stator and a ring of magnets on the rotor. The spacing between the magnets on the rotor can be "jittered" to provide a unique fingerprint that can be used to determine the angular position of the motor. However, changes in environmental conditions may affect the unique fingerprint readout. These changes may affect the accuracy of determining the angular position of the motor.

SUMMARY

The present disclosure generally relates to measuring mechanical runout and compensating for the runout's associated encoder error in rotary joint devices, such as brushless DC motors. Particularly, a processing system may detect a signal as a rotor spins relative to a stator. Any variations in the signal could indicate runout error. Based on determining and measuring the runout component in the signal, the runout component of the signal may then be removed to improve accuracy. By extracting the variation due to runout, the present disclosure may provide a way to account for unforeseen changes in the mechanical system of the brushless DC motor. For example, motor bearing health issues, or encoder error from dynamic loading. The correction may also serve as a way to improve calibration of brushless DC motors.

In one aspect, the present application describes generating a first magnetic field that interacts with a second magnetic field generated by four or more poles of a magnet ring mounted to a first platform. The magnetic field may cause the first platform to rotate about an axis of rotation relative to a second platform. The application also describes receiving, from a magnetic field sensor connected to the second platform, data indicative of characteristics of the second magnetic field. The characteristics of the second magnetic field may reflect that each respective boundary between neighboring poles of the four or more poles is shifted relative to a corresponding nominal boundary defined by a substantially uniform spacing of boundaries of the four or more poles around the magnet ring. The application further describes determining a magnetic field pattern based on the data received from the magnetic field sensor. Based on the magnetic field pattern, the application describes determining an angular position of the four or more poles of the magnet ring relative to the first platform. An angular difference between the angular position of the four or more poles of the magnet ring relative to the first platform and a nominal angular position defined by the substantially uniform spacing of boundaries of the four or more poles around the magnetic ring may also be determined. The determined angular difference could then be graphed. Finally, based on the amplitude of the graphed angular difference, a runout error could be determined.

In another aspect, the present application describes a method of mitigating encoder error in a brushless DC motor. The method may include generating a first magnetic field that interacts with a second magnetic field generated by four or more poles of a magnet ring mounted to a first platform such that the first platform rotates about an axis of rotation relative to a second platform. The method could further include receiving, from a magnetic field sensor connected to the second platform, data indicative of characteristics of the second magnetic field. The data may include that each respective boundary between neighboring poles of the four or more poles is shifted relative to a corresponding nominal boundary defined by a substantially uniform spacing of boundaries of the four or more poles around the magnet ring. Based on the data received from the magnetic field sensor, the method may include determining a signal defined by an angular position of the four or more poles of the magnet ring relative to the second platform. The method may further include determining a difference signal between the signal defined by the angular position of the four or more poles of the magnet ring relative to the second platform and a nominal signal defined by the substantially uniform spacing of boundaries of the four or more poles around the magnetic ring. The method may then include measuring and removing a sinusoidal component from the difference signal to determine a phase fingerprint signal. Finally, the method may include determining, based on the phase fingerprint signal, a position of the poles of the magnet ring on the first platform. The position may include the spacing between the respective boundaries between neighboring poles of the four or more poles.

In another aspect, the present application also describes a motor. The motor may include a magnet ring, including four or more magnetized poles, mounted to a first platform and a plurality of magnetic field sensors connected to a second platform. The second platform may rotate relative to the first platform about an axis. Further, during the rotation, the plurality of magnetic field sensors may output signals used to generate a runout corrected fingerprint associated with the motor.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

FIG. 1 is a simplified block diagram of a device that includes a rotary joint, in accordance with example embodiments.

FIG. 2 illustrates a side view of a device that includes a rotary joint, in accordance with example embodiments.

FIG. 5A illustrates a positive angular error due to runout, in accordance with example embodiments.

FIG. 5B illustrates a negative angular error due to runout, in accordance with example embodiments.

FIG. 6 illustrates a flow chart, in accordance with example embodiments.

DETAILED DESCRIPTION

Figure 3:
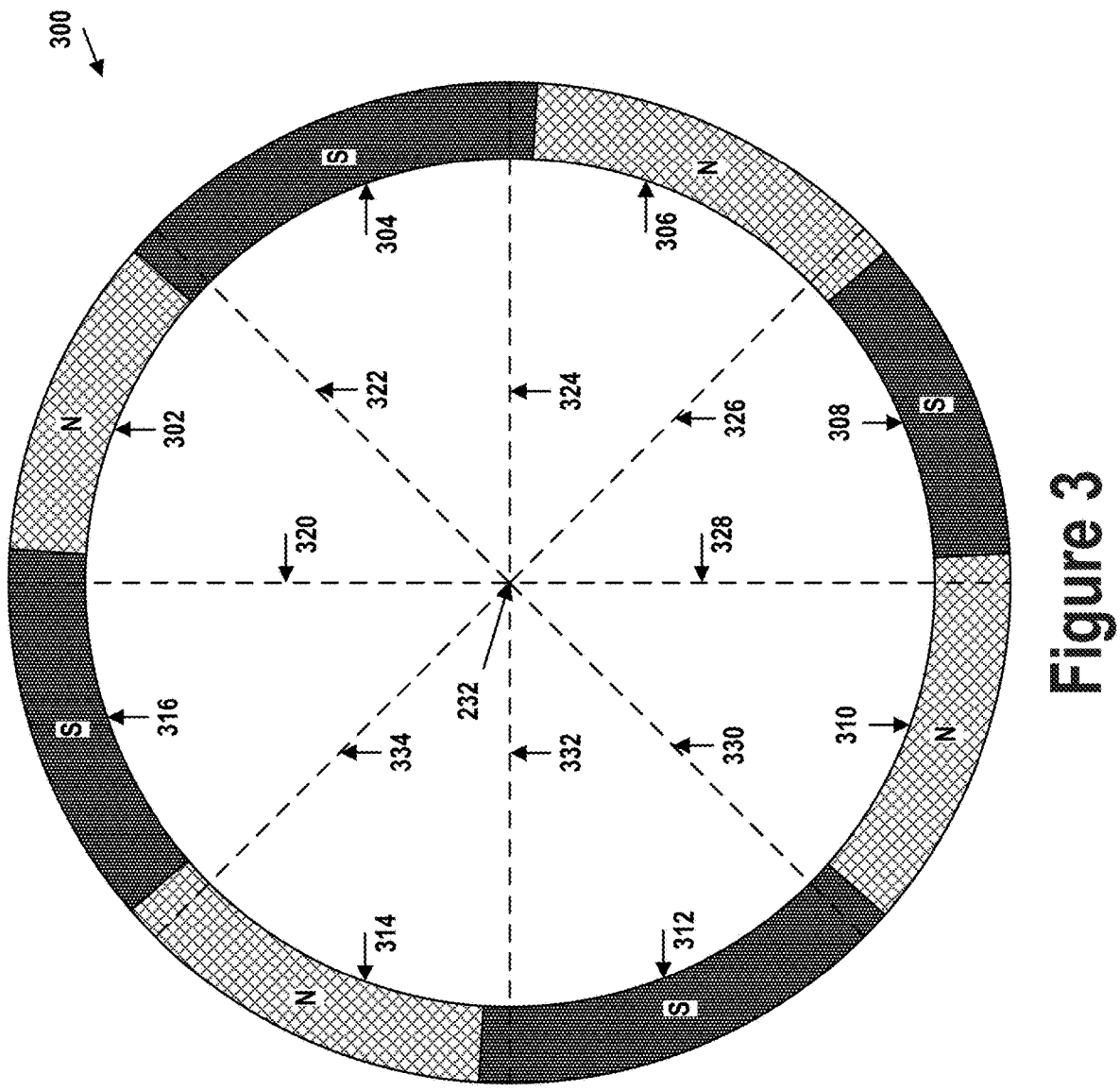
FIG. 3 illustrates a magnet ring, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For the purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

Many automotive, robotic, and industrial devices include components that rotate with respect to one another. Brushless DC motors are one example of a device that includes components that rotate with respect to each other. Such components may be included on or may themselves form two platforms that are rotationally coupled to each other. An example of a two-sided brushless DC motor may include two platforms arranged a predetermined distance from each other. In one example, the two platforms may include other, circularly shaped disks arranged concentrically about a common axis of the respective disks to maintain an overlap between the two platforms in response to rotation of any of the two platforms about the common axis.

In some cases, the angular position of the first platform relative to the second platform may be of interest. For example, the angular position, when tracked over time, may be used to determine and track a relative displacement between the first and second platforms. In another example, this angular position may be used to control an appendage of a robotic device, to direct or steer a sensor or other component on an automobile, or otherwise position the rotary joint. In a brushless DC motor for example, a magnet ring with jittered poles may be mounted to the first platform. The jittered poles may make the motor function as an absolute encoder. The angular spacing of the poles on the platform may be measured by one or more magnetic field sensors mounted to the second platform and used to determine an angular position of the poles on the platform. This angular position of the poles can also be used to determine the position of one platform with respect to the other. The angular position may assist in monitoring the health of the rotary joint device, and in determining manufacturer variance.

The magnet ring may be mounted about an axis of rotation of the two platforms. The boundary between each two neighboring poles may be jittered (e.g., shifted) relative to a corresponding nominal boundary for these two neighboring poles. The nominal boundary may be a reference point defined by a substantially uniform spacing of pole boundaries about the circumference of the magnet ring. Thus, jittered poles may be formed by the four or more magnetic poles having different sizes, resulting in the boundaries between being shifted relative to where the boundaries would be if each of the poles was of the same size.

The shifted pole boundaries may define a characteristic shift pattern for the magnet ring. This characteristic shift pattern may be known to a control system or circuitry used in association with the magnet ring and may be used as a reference in determining the rotational position of the magnet ring. Namely, one or more magnetic field sensors may be used to measure a magnetic field pattern of the magnet ring during rotation thereof. This measured magnetic field pattern, or aspects thereof, may be correlated (e.g., cross-correlated) with the characteristic shift pattern to determine an offset between the measured pattern and the characteristic pattern. The offset between the measured pattern and the characteristic pattern may indicate the relative position of the magnet ring relative to the sensor at different points during the measured pattern. That is, the offset may identify which of the poles are associated with the measured magnetic field pattern based on the characteristic shift pattern.

However, external factors could cause errors in detecting the measured magnetic field pattern. For example, manufacturer error in positioning the magnetic poles, or runout could erroneously affect the detected magnetic field pattern. If the measured shifted pole boundaries of a magnetic ring are different than the actual boundaries in the characteristic shift pattern, the correlation and offset between the measured pattern and the characteristic pattern may not be accurately calculated. Therefore, the relative position of the magnet ring and the angular position may not be determined reliably.

Some errors, such as manufacturer error can be corrected through calibration. However, runout is not usually an error that can be mitigated by pre-operation calibration. Changes in environmental or load conditions during operation, such as temperature, wind speed, acceleration and braking are typical factors that contribute to causing runout. Runout can affect the accuracy of magnetic field sensor data when a shaft supporting the platforms does not rotate exactly in line with the common axis of rotation. When the shaft is not rotating in line with the common axis of rotation, the magnetic field sensor may detect the positions of the magnet poles in improper locations. Therefore, runout may negatively affect determining the angular position of the magnetic poles.

In an example embodiment, a runout error could be measured and, based on the measured runout, the angular position of the magnetic poles could be more accurately calculated. For example, the measured runout could be used to correct for changes or errors in the angular positions of the magnetic poles. The measured runout could also be applied to data gathered by the magnetic field sensor as a calibration factor. The corrections based on determined runout may produce a more accurate measurement of the angular position of the first platform relative to the second platform.

Particularly, runout could be determined based on measuring a phase shift detected by the magnetic field sensors relative to a nominal reference angle sequence. As previously mentioned, an angular position of the magnetic poles may be determined from measurements gathered from a magnetic field sensor. Specifically, the measured magnetic field may assist in determining the location of the magnetic poles on the magnetic ring. The location of the magnetic poles on the magnetic ring could be compared to a nominal location of the poles based on the corresponding nominal boundaries to determine an angular difference in the actual to nominal magnetic pole positioning.

The angular differences in the locations of the poles, which correspond to a measured phase shift, could then be graphed to determine the runout. On a graph, runout may resemble a sinusoid. Particularly, the sinusoid may be a fixed period harmonic of a rotational frequency of the brushless DC motor. To more easily identify the sinusoidal variation, a DC component may be removed from the signal obtained by the magnetic field sensor. Once an AC component is graphed, the signal may take a more sinusoid shape. The amplitude of the sinusoid may correspond with the amount of runout.

To remove the sinusoidal runout error from the graphed data, the data could be transformed by a Fourier Transform. By removing the sinusoid, the amount of runout the brushless DC motor is experiencing can be removed from the signal detected by the magnetic field sensors. Removing the runout may improve the accuracy of determining the angular position of the first platform relative to the second platform. Additionally or alternatively, the runout determination could be used as a calibration factor when processing the data gathered from the magnetic field sensor.

II. EXAMPLE ROTARY JOINTS

FIG. 1 is a simplified block diagram of a device 100 that includes a rotary joint. As shown, device 100 includes a first platform 110 and a second platform 130. First platform 110 may comprise or may be coupled to a rotor or other moveable component. For example, platform 110 can be configured to rotate relative to platform 130 and about an axis of rotation of platform 110 (e.g., rotor axis). Thus, platform 110 can be configured as a rotating platform in a rotary joint configuration. As shown, platform 110 includes sensor 112, controller 114, communication interface 116, power interface 118, and one or more magnets 120.

In some examples, platform 110 may comprise any solid material suitable for supporting and/or mounting the various components of platform 110. For instance, platform 110 may include a printed circuit board (PCB) that mounts communication interface 116 and/or other components of platform 110. The PCB in this instance can also include circuitry (not shown) to electrically couple one or more of the components of platform 110 (e.g., sensor 112, controller 114, communication interface 116, power interface 118, etc.) to one another. The PCB in this instance can be positioned such that the mounted components are along a side of platform 110 facing or opposite to a corresponding side of platform 130. With this arrangement, for instance, platforms 110 and 130 may remain within a given distance to one another in response to a rotation of platform 110 relative to platform 130.

Sensor 112 may include any combination of sensors mounted to platform 110. A non-exhaustive list of example sensors may include direction sensors (e.g., IMUs, gyroscopes, accelerometers, etc.), remote sensing devices (e.g., RADARs, LIDARs, etc.), sound sensors (e.g., microphones), among other examples.

Controller 114 may be configured to operate one or more of the components of first platform 110. To that end, controller 114 may include any combination of general-purpose processors, special-purpose-processors, data storage, logic circuitry, and/or any other circuitry configured to operate one or more components of device 100. In one implementation, controller 114 includes one or more processors that execute instructions stored in data storage to operate sensor 112, interface 116, etc. In another implementation, controller 114 alternatively or additionally includes circuitry wired to perform one or more of the functions and processes described herein for operating one or more components of device 100. In one example, controller 114 can be configured to receive sensor data collected by sensor 112, and to provide a modulated electrical signal indicative of the sensor data to communication interface 116. For instance, the sensor data may indicate a measured orientation, a scan of a surrounding environment, detected sounds, and/or any other sensor output of sensor 112.

Communication interface 116 may include any combination of wireless or wired communication components (e.g., transmitters, receivers, antennas, light sources, light detectors, etc.) configured to transmit and/or receive data and/or instructions between platforms 110 and 130. In one example, where communication interface 116 is an optical communication interface, interface 116 may include one or more light sources arranged to emit modulated light signal 102 for receipt by a light detector included in platform 130. For instance, signal 102 may indicate sensor data collected by sensor 112. Further, in this example, interface 116 may include a light detector for receiving modulated light signal 104 emitted from platform 130. For instance, signal 104 may indicate instructions for operating sensor 112 and/or any other component coupled to platform 110. In this instance, controller 114 can operate sensor 112 based on the received instructions detected via interface 116.

Power interface 118 may include one or more components configured for wireless (or wired) transmission of power between platforms 110 and 130. By way of example, interface 118 may include transformer coil(s) (not shown) arranged to receive a magnetic flux extending through the transformer coils to induce an electrical current for powering one or more components (e.g., sensor 112, controller 114, communication interface 116, etc.) of platform 110. For instance, the transformer coils can be arranged around a center region of platform 110 opposite to corresponding transformer coils included in platform 130. Further, for instance, device 100 may also include a magnetic core (not shown) extending through the transformer coils in interface 118 (and/or transformer coils included in platform 130) to guide the magnetic flux through the respective transformer coils thereby improving efficiency of power transmission between the two platforms. Other configurations are possible as well.

Magnet(s) 120 may be formed from a ferromagnetic material such as iron, ferromagnetic compounds, ferrites, etc., and/or any other material that is magnetized to generate a first-platform magnetic field of platform 110. For example, magnet(s) 120 may be Neodymium-Iron-Boron (NdFeB) magnets. In another example, magnet(s) 120 might not include iron in the composition thereof and might thus be, for example, Aluminum-Nickel-Cobalt (AlNiCo) magnets, among other possibilities.

In one implementation, magnets 120 can be implemented as a plurality of magnets in a substantially circular arrangement around an axis of rotation of platform 110. For example, magnets 120 can be arranged along a circle that is concentric to the axis of rotation to generate a combined magnetic field extending toward and/or through platform 130. Further, for instance, adjacent magnets of magnets 120 can be magnetized in alternating directions such that a magnetic pole of a given magnet along a surface of the given magnet that is facing platform 130 is opposite to a magnetic pole of an adjacent magnet along a similar surface. With this arrangement for instance, a magnetic field may extend from the surface of the given magnet toward platform 130 and then toward the surface of the adjacent magnet. Further, another magnetic field may extend from a surface of the given magnet toward platform 130 and then toward another adjacent magnet.

In another implementation, magnet 120 can be implemented as a single ring magnet that is concentric to the axis of rotation of the first platform. In this implementation, the ring magnet can be magnetized to have a magnetization pattern similar to that of the plurality of magnets described above. For example, the ring magnet can be implemented as a printed magnet having a plurality of ring sectors (e.g., regions of the ring magnet between respective radial axes thereof). In this example, adjacent ring sectors of the ring magnet can be magnetized in alternating directions to define a plurality of alternating magnetic poles facing platform 130.

In a further implementation, magnet 120 can be implemented as a plurality of electromagnets in a substantially circular arrangement around the axis of rotation of platform 110. In this implementation, the electromagnets can be magnetized (e.g., driven with a current having a particular direction) to have a magnetization pattern similar to that of the plurality of magnets described above. For example, adjacent electromagnets in the substantially circular arrangement can be magnetized in alternating directions to define a plurality of alternating magnetic poles facing platform 130.

Second platform 130 can be configured as a stator platform in a rotary joint configuration. For instance, the axis of rotation of platform 110 can extend through platform 130 such that platform 110 rotates relative to platform 130 while remaining within a given distance to platform 130. As shown, platform 130 includes controller 134, communication interface 136, power interface 138, conductive structures 140, circuitry 150, and a magnetic field sensor 190. To that end, platform 130 can be formed from any combination of solid materials suitable for supporting the various components mounted or otherwise coupled to platform 130. In some examples, platform 130 may comprise a circuit board that mounts one or more components (e.g., interfaces 136, 138, sensor 190, etc.) of device 100.

Controller 134 can have various physical implementations (e.g., processors, logic circuitry, analog circuitry, data storage, etc.) similarly to controller 114, for example. Further, controller 134 can operate communication interface 136 to transmit signal 104 indicating a transmission of data or instructions similarly to, respectively, controller 114, communication interface 116, and signal 102, for example. For instance, controller 134 can operate interface 136 (e.g., transceiver, antenna, light sources, etc.) to provide a modulated wireless signal indicating instructions for operating sensor 112 and/or any other component of platform 110. Further, for instance, controller 134 can receive a modulated electrical signal from interface 136 indicating modulated signal 102 transmitted from platform 110.

Communication interface 136 can be implemented similarly to interface 116 to facilitate communication between platforms 110 and 130 via signals 102 and 104.

Power interface 138 can be configured similarly to power interface 118, and may thus be operated in conjunction with power interface 118 to facilitate transmission of power between platforms 110 and 130. By way of example, interface 138 may comprise a transformer coil (not shown), and controller 134 can be configured to cause an electrical current to flow through the transformer coil. The electrical current may then generate a magnetic flux that extends through a corresponding transformer coil (not shown) of power interface 118 to induce an electrical current through the corresponding transformer coil. The induced electrical current could thus provide power for one or more components of platform 110.

Conductive structures 140 may comprise portions of electrically conductive material (e.g., copper, other metal, etc.) that are electrically coupled together to define an electrically conductive path that extends around the axis of rotation of platform 110 to overlap the first-platform magnetic field generated by magnet(s) 120. By way of example, conductive structures 140 may include a first plurality of conductive structures in a first coplanar arrangement along a circle that is concentric to the axis of rotation of platform 110. Further, in this example, conductive structures 140 may also include a second plurality of conductive structures in a second coplanar arrangement to overlap parallel to the first plurality of conductive structures. For instance, in a circuit board implementation, the first plurality of conductive structures can be disposed or patterned along a single layer of the circuit board, and the second plurality of conductive structures can be disposed or patterned along another layer of the circuit board.

Continuing with the example above, device 100 could also include a plurality of electrical contacts (not shown), such as conductive material that extends through a drilled hole between two layers of a circuit board (e.g., via) for instance. The electrical contacts may couple the first plurality of conductive structures to the second plurality of conductive structures to define one or more conductive coils extending around the axis of rotation to overlap the circular arrangement of magnet(s) 120 of the first platform. Circuitry 150 (and/or controller 134) can then cause one or more electrical currents to flow through the one or more coils to generate a second-platform magnetic field extending within the one or more coils. The first-platform magnetic field could then interact with the second-platform magnetic field to provide a force or torque acting on platform 110. The induced force may then cause platform 110 to rotate about the axis of rotation thereof. Further, in some instances, circuitry 150 (and/or controller 134) can modulate the second-platform magnetic field by adjusting the electrical current(s) flowing through the coil(s). By doing so, for instance, device 100 can control a direction or rate of rotation of platform 110 about the axis of rotation.

Accordingly, circuitry 150 may include any combination of wiring, conductive material, capacitors, resistors, amplifiers, filters, comparators, voltage regulators, controllers, and/or any other circuitry arranged to provide and modulate electrical current(s) flowing through conductive structures 140. For instance, circuitry 150 may be configured to condition the electrical current(s) to modify the second-platform magnetic field and thereby achieve certain rotation characteristics (e.g., direction, speed, etc.) for rotating platform 110.

Magnetic field sensor 190 may be configured to measure one or more characteristics (e.g., direction, angle, magnitude, flux density, etc.) of the first-platform magnetic field associated with magnet(s) 120. For example, sensor 190 may include one or more magnetometers arranged to overlap magnet(s) 120 and/or the first-platform magnetic field. A non-exhaustive list of example sensors includes proton magnetometers, Overhauser effect sensors, cesium vapor sensors, potassium vapor sensors, rotating coil sensors, Hall effect sensors, magneto-resistive device sensors, fluxgate magnetometers, superconducting quantum interference device (SQUID) sensors, micro-electro-mechanical-system (MEMS) sensors, and spin-exchange relaxation-free (SERF) atomic sensors, among other examples. In one implementation, sensor 190 may comprise a three-dimensional (3D) Hall effect sensor that outputs an indication of an angle (and/or magnitude) of the first-platform magnetic field at a position of sensor 190 according to an orthogonal coordinate system representation (e.g., x-y-z axis components) or other vector field representation. In another implementation, sensor 190 may comprise a binary Hall Effect sensor that outputs a binary indication of flux transition between magnetic poles. The transition between magnetic poles may henceforth be referred to as hall ticks.

Thus, device 100 could use output(s) from sensor 190 as a basis for determining an orientation or position of platform 110 about the axis of rotation. By way of example, sensor 190 can be positioned to overlap a portion of the first-platform magnetic field extending between two adjacent magnets of magnet(s) 120. As first platform 110 rotates, the angle of the portion may change at the position of sensor 190 and thus circuitry 150 (and/or controller 134) can sample outputs from sensor 190 to deduce the position of sensor 190 relative to the two adjacent magnets.

Thus, with this arrangement, device 100 could use magnet(s) 120 as component(s) for both actuating platform 110 and measuring the orientation of platform 110 (e.g., magnetic encoder). This arrangement can provide an actuator and a magnetic encoder with reduced costs and with a more compact design.

In some implementations, device 100 may include fewer or more components than those shown. In one example, device 100 can be implemented without sensor 190, and/or any other component shown. In another example, platforms 110 and/or 130 may include additional or alternative sensors (e.g., microphone, etc.), computing subsystems, and/or any other component. Additionally, it is noted that the various functional blocks shown can be arranged or combined in different arrangements than those shown. For example, some of the components included in platform 110 can be alternatively included in platform 130 or implemented as separate components of device 100.

FIG. 2 illustrates a side view of device 200 that includes a rotary joint. As shown, device 200 includes a rotor platform 210 and a stator platform 230 that may be similar, respectively, to platforms 110 and 130. In the example shown, a side 210a of platform 210 is positioned at a given distance 208 to a side 230a of platform 230. Platform 210 can be configured as a rotor platform that rotates about axis of rotation 206. Further, platform 230 can be configured as a stator platform that remains within distance 208 to platform 210 in response to rotation of platform 210 about axis 206 on shaft 232. In some examples, side 210a may correspond to a planar mounting surface of platform 210 (e.g., an outer layer of a circuit board). Similarly, for example, side 230a may correspond to a planar mounting surface of platform 230.

An example embodiment may include a motor, for instance a brushless DC motor. A magnet ring may be mounted to a first platform of the motor, and the magnet ring may include four or more magnetized poles. The motor may further include a plurality of magnetic field sensors connected to a second platform. The second platform may be configured to rotate relative to the first platform about an axis and the plurality of magnetic field sensors may be configured to output signals used to generate a runout corrected fingerprint associated with the motor. As the second platform rotates, the magnetic field sensors may detect the displacement at the axis that is caused by runout. Runout may cause the distance between the magnets and the magnetic field sensors to vary as the platform rotates. This displacement may manifest in an electrical phase shift in the signal gathered by the magnetic field sensors.

In an example embodiment, the plurality of magnetic field sensors may be Hall Effect sensors. The Hall Effect sensors may gather data that is used to correct for runout, and encoder error. The runout corrected fingerprint may be generated by determining a phase difference between each hall tick and an expected nominal location of each hall tick. In an example embodiment, there may be a nominal location at where the magnetic field sensors should detect a hall tick. However, the actual location where the magnetic field sensor measures hall tick may be different. This is the phase difference. The amplitude of the phase difference may indicate the amount of runout.

III. EXAMPLE MAGNET RING WITH JITTERED POLES

FIG. 3 illustrates magnet ring 300 that has jittered poles. Specifically, FIG. 3 illustrates a top-down view of magnet ring 300 which may, for example, be disposed on side 230a of platform 230. Magnet ring 300 may alternatively be referred to as a ring magnet, magnetic ring, or simply a ring. In this example, magnet ring 300 includes eight magnetic poles 302, 304, 306, 308, 310, 312, 314, and 316 (i.e., poles 302-316). Poles 302, 306, 310, and 314 are magnetized with their respective north poles ("N") facing out of the page (i.e., pointing up from platform 230 towards platform 210). On the other hand, poles 304, 308, 312, and 316 are magnetized with their respective south poles ("S") facing out of the page (i.e., pointing down from platform 230). Although magnet ring 300 includes eight magnetic poles in this example, it is to be understood that the number of magnetic poles may range from four poles to a few hundred or thousand poles, depending, for example, on the size of magnet ring 300. Poles 302-316 may be defined by discrete magnets, by ring sectors of a ring magnet, or by electromagnets.

The boundary between neighboring poles (e.g., pole 302 and pole 304) of poles 302-316 is jittered. That is, the boundary is shifted relative to where the boundary would be if each of the poles were of equal size. Stated another way, each of poles 302-316 has a slightly different size, resulting in uneven spacing of (i.e., an asymmetric distribution of) pole boundaries around magnet ring 300.

In FIG. 3, lines 320, 322, 324, 326, 328, 330, 332, and 334 (i.e., lines 320-334) illustrate where the pole boundaries would fall if each of poles 302-316 was of equal size. That is, lines 320-334 illustrate an even spacing of (i.e., a symmetric distribution of) pole boundaries along magnet ring 300. The boundaries defined by lines 320 to 334 may be referred to as nominal boundaries. In magnet ring 300, however, each of the actual boundaries between neighboring poles in poles 302-316 is shifted by a respective amount relative to the corresponding nominal boundary in nominal boundaries 320-334, thereby defining a characteristic shift pattern of pole boundaries. For example, pole 304 starts before line 322 and ends after line 324, whereas without such jitter pole 304 would start at line 322 and end at line 324.

The pattern of the respective shifts in the transitions or boundaries between poles 302-316 may be used to determine a rotational position of magnet ring 300 relative to another structure rotating relative thereto. Specifically, during operation, the transitions between adjacent poles may be measured by a magnetic field sensor. The measured transitions may then be compared to the known pattern of transitions for magnet ring 300 to identify the rotational position thereof, as described in more detail below. For example, the position of platform 230 (to which magnet ring 300 may be coupled) relative to platform 210 may be determined.

IV. EXAMPLE SENSOR POSITIONING FOR MAGNETIC RING FINGERPRINTING

As discussed above, a single magnetic field sensor may be used to detect a magnetic field pattern of magnet ring 300 as it rotates. This magnetic field pattern may be compared to the characteristic field pattern to determine the rotational position of magnet ring 300. This comparison may involve computing a correlation between the measured magnetic field pattern and the characteristic shift pattern. In one implementation, this computation may be performed with a step size of one, resulting in a comparison of each detected shift value to each known shift value reflected in the characteristic shift pattern.

Additionally, in some implementations, the system or device that utilizes magnet ring 300 may employ multiple magnetic field sensors in determining the position of magnet ring 300. Notably, the additional magnetic field sensors may be spaced about the circumference of magnet ring 300 and may therefore detect, within a given time window or for a given angular displacement of magnet ring 300, more pole transitions than a single magnetic field sensor.

Figure 4:
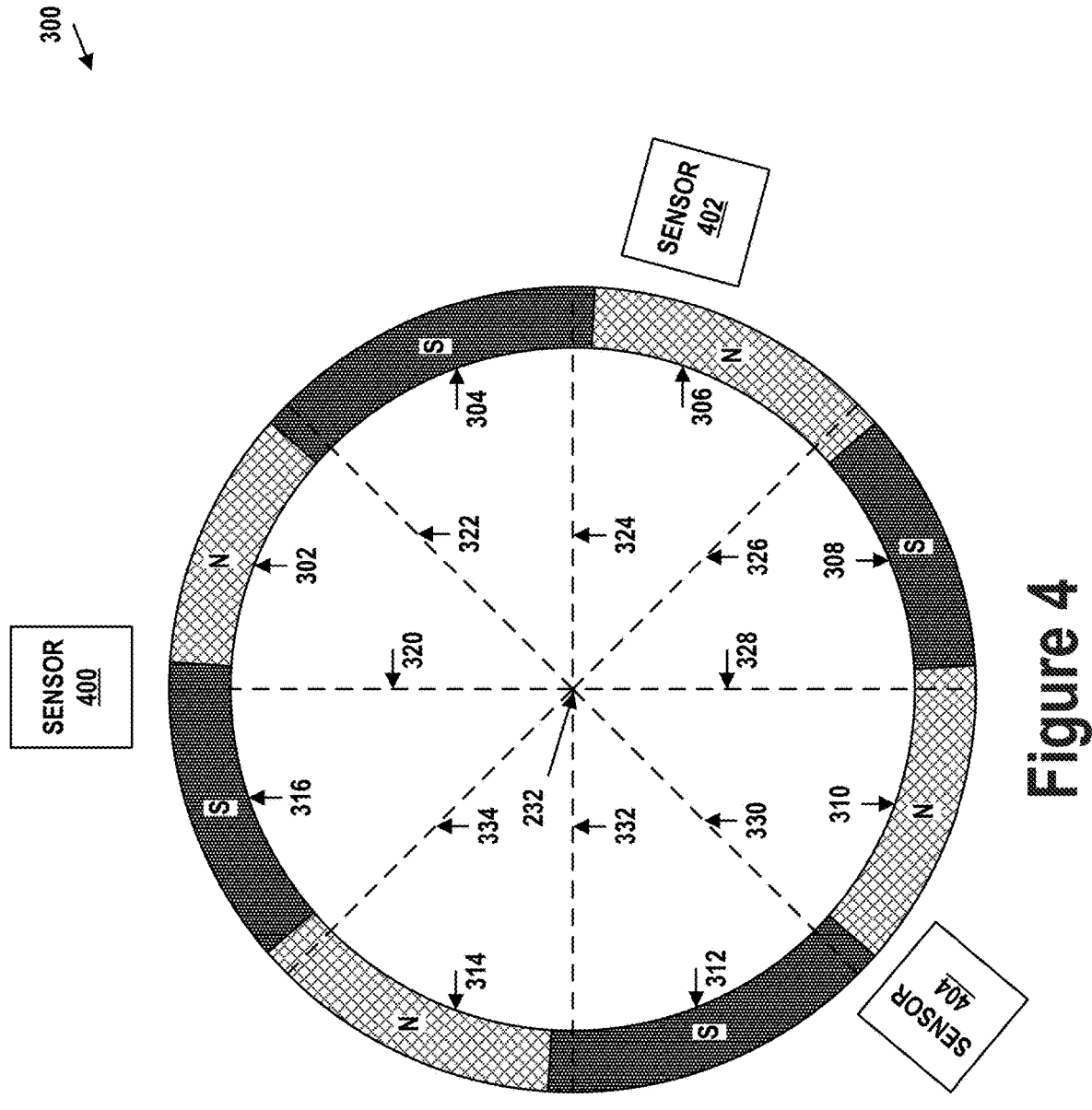
FIG. 4 illustrates a magnet ring and magnetic field sensors, in accordance with example embodiments.

FIG. 4 illustrates an example arrangement of magnetic field sensors 400, 402, and 404 (i.e., sensors 400-404) around magnet ring 300 centered on shaft 232. Sensors 400-404 may be connected to side 210a of platform 210 such that they move relative to magnet ring 300 (connected to side 230a of platform 230) and thus detect changes in the characteristic of the magnetic field across poles 302-316.

In one implementation, sensor 400 may be disposed at 0 degrees, sensor 402 may be disposed at 100 degrees, and sensor 404 may be disposed at 220 degrees. That is, sensor 402 may be separated from sensor 400 by 100 degrees, sensor 404 may be separated from sensor 402 by 120 degrees, and sensor 404 may be separated from sensor 400 by 140 degrees. Thus, by rotating magnetic ring by 140 degrees, sensors 400-404 may collectively detect each of the transitions thereon.

In some implementations, sensors 400-404 may be spaced around magnet ring 300 in a symmetric fashion (e.g., separated by 120 degrees from each other). In such cases, the composite characteristic pattern may also be used to determine the position of magnet ring 300 with respect to sensors 400-404. However, the pattern generated by each of sensors 400-404 will be periodically repeated every 120 degrees. For example, when magnet ring 300 is rotated by 120 degrees, sensor 402 will generate a first output pattern. When magnet ring 300 is rotated counterclockwise by another 120 degrees, sensor 400 will generate a second output pattern approximately identical (aside from any noise) to the first output pattern.

V. EXAMPLE OPERATIONS FOR DETERMINING RUNOUT

As discussed above, example embodiments may include methods for determining a runout factor for a rotary device. Specifically, runout may affect data gathered by magnetic field sensors and cause errors in determining angular position of the first platform. Runout may be represented as a sinusoidal linearity error over a period of one revolution. However by measuring the linearity error and separating the error from a signal detected by the magnetic field sensor, the runout error could be removed from the data.

An example embodiment may disclose tracking the difference in a phase between the measured location of each magnetic pole and the expected nominal location to determine runout. A change in phase angle could be caused by an increase or decrease in magnet spacing compared to the nominal spacing which may indicate runout. FIGS. 5A and 5B illustrate runout and how it corresponds with phase difference detected by a magnetic field sensor. The figures may be related to at least either of devices 100 or 200. In the figures, platform 230 is centered on shaft 232, but shaft 232 is not at the common axis of rotation 206 for the device. As the platform 210 rotates, the magnetic field sensors may detect the displacement at the axis 206 that is caused by runout. Runout may cause the distance between the magnets on platform 210 and the magnetic field sensors 400 to vary as the platform rotates. This displacement may manifest in an electrical phase shift in the signal gathered by the magnetic field sensors.

In FIG. 5A, when the magnetic field sensor 400 is closer to the magnetic ring 300, there may be a positive angular error. Positive angular error may be considered a speed increase at the sensor due to the sensor moving closer to the magnetic ring 300. However, in FIG. 5B, when the magnetic field sensor 400 is farther from magnetic ring 300, there may be a negative angular error. The negative angular error may indicate an apparent speed decrease when the sensor is farther from the magnetic ring.

FIG. 6 illustrates flow chart 600 of operations related to determining a runout error. The operations may be used with any of devices 100 or 200, or magnet ring 300. The operations may be carried out by, for example, controller 114, controller 134, or circuitry that is configured to perform the operations.

Block 602 may involve generating a first magnetic field that interacts with a second magnetic field generated by four or more poles of a magnet ring mounted to a first platform such that the first platform rotates about an axis of rotation relative to a second platform.

Block 604 may involve receiving, from a magnetic field sensor connected to the second platform, data indicative of characteristics of the second magnetic field, wherein each respective boundary between neighboring poles of the four or more poles is shifted relative to a corresponding nominal boundary defined by a substantially uniform spacing of boundaries of the four or more poles around the magnet ring.

Block 606 may involve determining a magnetic field pattern based on the data received from the magnetic field sensor. In some embodiments, the magnetic field pattern may be alternatively referred to as a measured magnetic field pattern.

Block 608 may involve, based on the magnetic field pattern, determining an angular position of the four or more poles of the magnet ring relative to the second platform. The angular position of the poles of the magnetic ring may be defined by using the magnetic field pattern to determine the locations of the magnetic poles on the magnetic ring.

Block 610 may involve determining an angular difference between the angular position of the four or more poles of the magnet ring relative to the second platform and a nominal angular position defined by the substantially uniform spacing of boundaries of the four or more poles around the magnetic ring. Specifically, the angular difference may be the difference between the measured position of the magnetic poles and the expected nominal position of the magnetic poles.

Block 612 may involve determining a runout error based on an amplitude of the angular difference. The amplitude may be defined by the amount the shaft 232 supporting the two platforms migrates away from the common axis 206 while rotating.

In some embodiments, determining the magnetic field pattern may be based on data generated by the magnetic field sensor while the first platform rotates relative to the second platform. In an example embodiment, the first platform may be rotating at a constant velocity for at least a portion of a full rotation.

In some embodiments, the data received from the magnetic field sensor may include the transition between neighboring poles of the four or more poles. For example, the magnetic field sensor may detect the edges of the magnetic pole. Specifically, the magnetic field sensor may detect when the flux is zero.

In some embodiments, the angular position may be determined with the time stamps. An example embodiment may include receiving, from the magnetic field sensor, time stamps when the magnetic field sensor detects the four or more poles of the magnetic ring, and converting each time stamp into respective angles using a constant velocity assumption. The time stamps may form an array indicating each time the magnetic field sensor detected a transition between the poles of the magnetic ring. Each respective time stamp could be converted to determine the angular location of the poles of the magnetic ring. Specifically, by knowing the time each pole is detected and by assuming a constant velocity, the angular position of the poles of the magnet ring on the first platform can be determined. The outcome may include an array of angular positions of the poles.

An example embodiment may further include using the array of the measured angular position of the poles of the magnetic ring and comparing it to an array of expected nominal angular position of the poles of the magnetic ring to determine an angular difference array between the two. The angular difference could also be considered an array of offsets between the measured locations and the nominal locations.

In an example embodiment, the angular difference may further include a DC component and an AC component. The data gathered by the magnetic field sensor during operation may include the transition between the poles of the magnetic ring and may comprise both AC and DC components. As previously discussed, the signal from the magnetic field sensor may be used in determining the runout. Therefore, because the angular difference may be based on the signal obtained by the magnetic field sensor, the angular difference may also include an AC component and a DC component.

In an example embodiment, the DC component may be removed from the angular difference to determine an AC signal and the AC signal may then be graphed. Removing the DC component, may improve the ability to determine runout. As previously discussed, the angular difference may include an array including the angular difference for the location of each respective pole of the magnetic ring. In an example embodiment, a debias function may be used to calculate a mean DC offset for each element in the angular difference array. Although a debias function may be used to calculate a mean DC offset, it is to be understood that a number of other methods are possible for calculating the offset. Each element in the angular difference array may be returned with the DC component removed. The AC component of the angular differences in the locations of the poles of the magnet ring could then be graphed.

An example embodiment may further include graphing the angular difference and fitting the graph of the angular difference to a sinusoid. The angular difference may be indicative of the measured pole location's phase shift from the expected nominal location. In an example embodiment, the operations may include graphing a signal obtained by the magnetic field sensor that is indicative of the phase shift. The runout error may be based on an amplitude of the sinusoid. To fit the graph of the angular difference to a sinusoid, the method may include using a non-linear least squares fit of a sinusoidal function with a fixed period. Alternatively, a Fast Fourier Transform may be used to fit the graph of the angular difference to a best matched sine wave. It should be understood that other methods could also be used to fit the graph to a sinusoid.

Figure 7A:
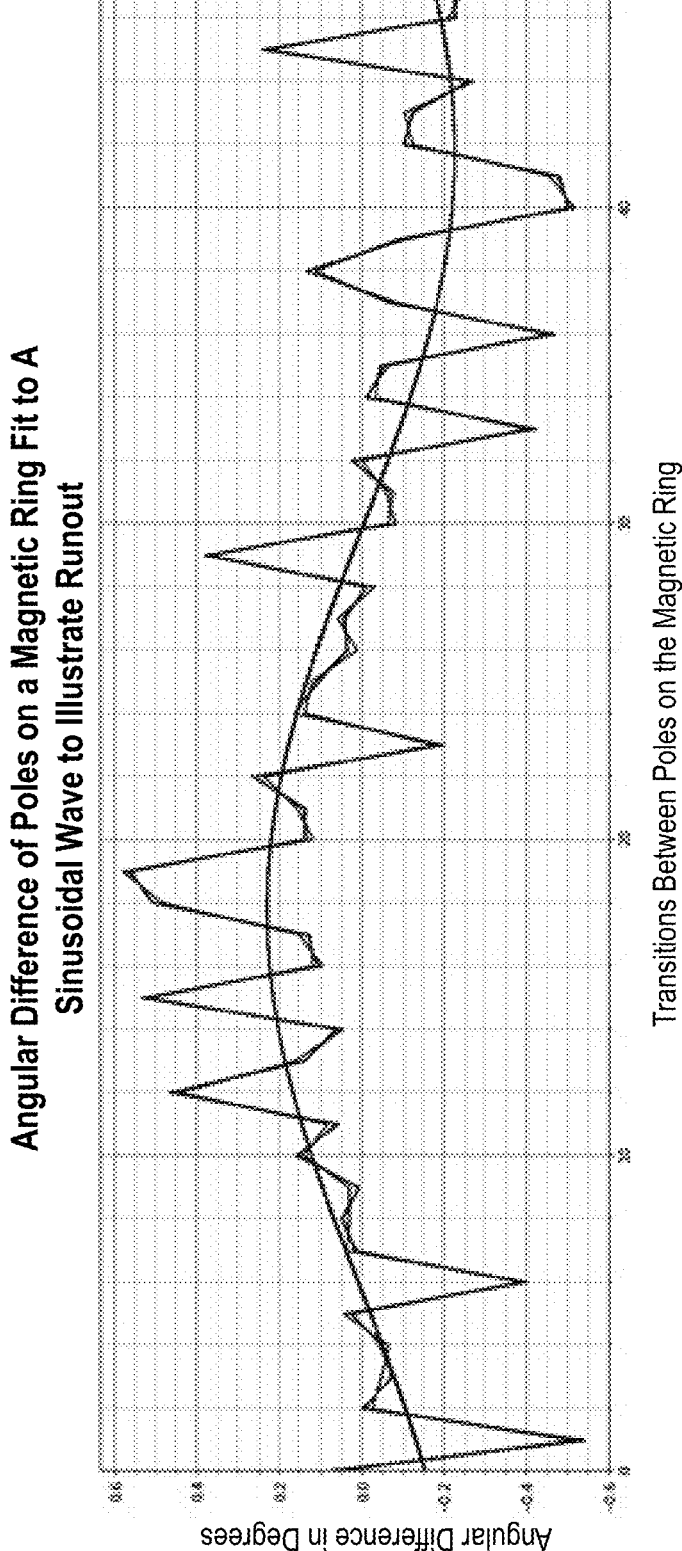
FIG. 7A illustrates a graph of the angular difference with runout, in accordance with example embodiments.

FIG. 7A illustrates a graph of the angular difference for each of the respective locations of a transition between poles of the magnetic ring detected by the magnetic field sensor. The horizontal axis of the graph indicates the amount of degrees in the angular difference and the horizontal axis represents each transition between poles in the magnetic ring. Therefore, the graph may illustrate the offset between the measured angular positions of the poles of the magnetic ring and the expected nominal angular positions. However, the graph also illustrates how runout error may be manifested in the signal as a sinusoid. As previously discussed, runout may cause an erroneous detection of a location of poles on the magnet ring. FIG. 7A illustrates that as the runout increases, the deviation in the angular difference increases. Specifically, the angular difference oscillates with the sinusoidal runout error. This is caused by at least one of the platforms shifting from side to side, thus causing an apparent change in the detected distance between poles on the magnetic ring.

Figure 7B:
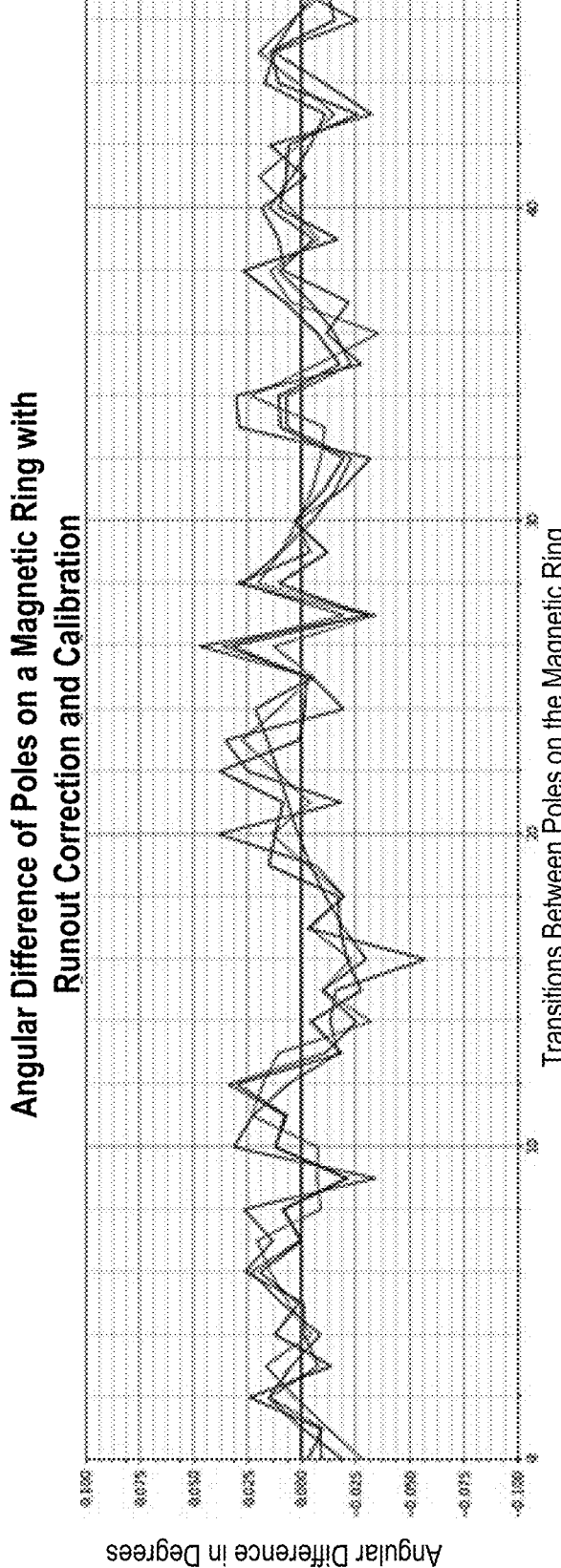
FIG. 7B illustrates a graph of the calibrated angular difference without runout, in accordance with example embodiments.

An example embodiment may further include determining, based on the runout, a runout calibration factor and applying the calibration factor to the data received by the magnetic field sensor. The runout calibration factor could be based on the amplitude of the sinusoidal deviation in the angular difference signal. Further, applying the calibration factor could include subtracting the sinusoidal component from the graphed angular difference to determine a more correct location of the poles on the magnet ring. For example, the sinusoidal component could be removed by subtracting an array containing values of the sinusoid at each of the angular positions of the poles of the magnet ring from an array of equal length containing the measured angular positions of the poles of the magnet ring. The array containing values of the sinusoid at each of the angular positions of the poles of the magnet ring could be generated using parameters gathered from fitting the graph of the angular difference to a sinusoid. It is to be understood that a number of ways for subtracting out a sinusoidal component are possible. FIG. 7B illustrates a graph of the angular difference for each of the respective locations of a transition between poles of the magnetic ring detected by magnetic field sensors once the sinusoidal runout error was removed and the results were calibrated. The resulting graph does not include sinusoidal variation in the signal. Consequently, the difference angle appears to be much more accurate.

In an example embodiment, the method may include determining a phase shift based on the magnetic field pattern and a nominal magnetic field pattern. The nominal magnetic field pattern may be defined by the substantially uniform spacing of boundaries of the four or more poles around the magnetic ring. The phase shift may be a variation in phase between the measured magnetic field pattern versus the nominal magnetic field pattern. The amplitude of the phase difference may indicate the amount of runout.

An example embodiment may also include a non-transitory computer-readable storage medium to execute at least some of the operations previously described. Specifically, the non-transitory computer-readable medium may have stored thereon instructions that, when executed by a computing device, cause the computing device to perform operations.

The operations may involve providing instructions to generate a first magnetic field by causing an electrical current to flow through an electrically conductive path. The first magnetic field may interact with a second magnetic field generated by four or more poles of a magnet ring mounted to a first platform such that the first platform rotates about an axis of rotation relative to a second platform. The electrically conductive path may be included in the second platform.

The operations may involve receiving, from a magnetic field sensor connected to the second platform, data indicative of characteristics of the second magnetic field. Each respective boundary between neighboring poles of the four or more poles may be shifted relative to a corresponding nominal boundary defined by a substantially uniform spacing of boundaries of the four or more poles around the magnet ring.

The operations may also involve determining a magnetic field pattern based on the data received from the magnetic field sensor. In some embodiments, the magnetic field pattern may be alternatively referred to as a measured magnetic field pattern. Based on the magnetic field pattern, the operations may include determining an angular position of the four or more poles of the magnet ring relative to the first platform. The angular position of the poles of the magnetic ring may be defined by using the magnetic field pattern to determine the locations of the magnetic poles on the magnetic ring.

The operations may further involve determining the phase difference. The phase difference may be an angular difference between the angular position of the four or more poles of the magnet ring relative to the first platform and a nominal angular position defined by the substantially uniform spacing of boundaries of the four or more poles around the magnetic ring.

Specifically, the angular difference may be defined as the difference between the measured position of the magnetic poles and the expected nominal position of the magnetic poles.

The operations may involve graphing the angular difference. The angular difference may be indicative of the measured pole location's phase shift from the expected nominal location. In an example embodiment, the operations may include graphing a signal obtained by the magnetic field sensor that is indicative of the phase shift. Finally, the operations may involve determining a runout error based on the amplitude of the graphed angular difference. The amplitude may be defined by the amount the shaft supporting the two platforms migrates away from the common axis while rotating.

VI. ADDITIONAL EXAMPLE OPERATIONS

As discussed above, a single magnetic field sensor may be used to detect a magnetic field pattern of a magnet ring as it rotates. Additional magnetic ring sensors could also be added to detect the magnetic field pattern of the magnetic ring with more accuracy. This may improve the estimated location of the poles on the magnetic ring. Further, determining a runout error may ultimately improve determining the respective locations of the poles on the magnet ring.

Figure 8:
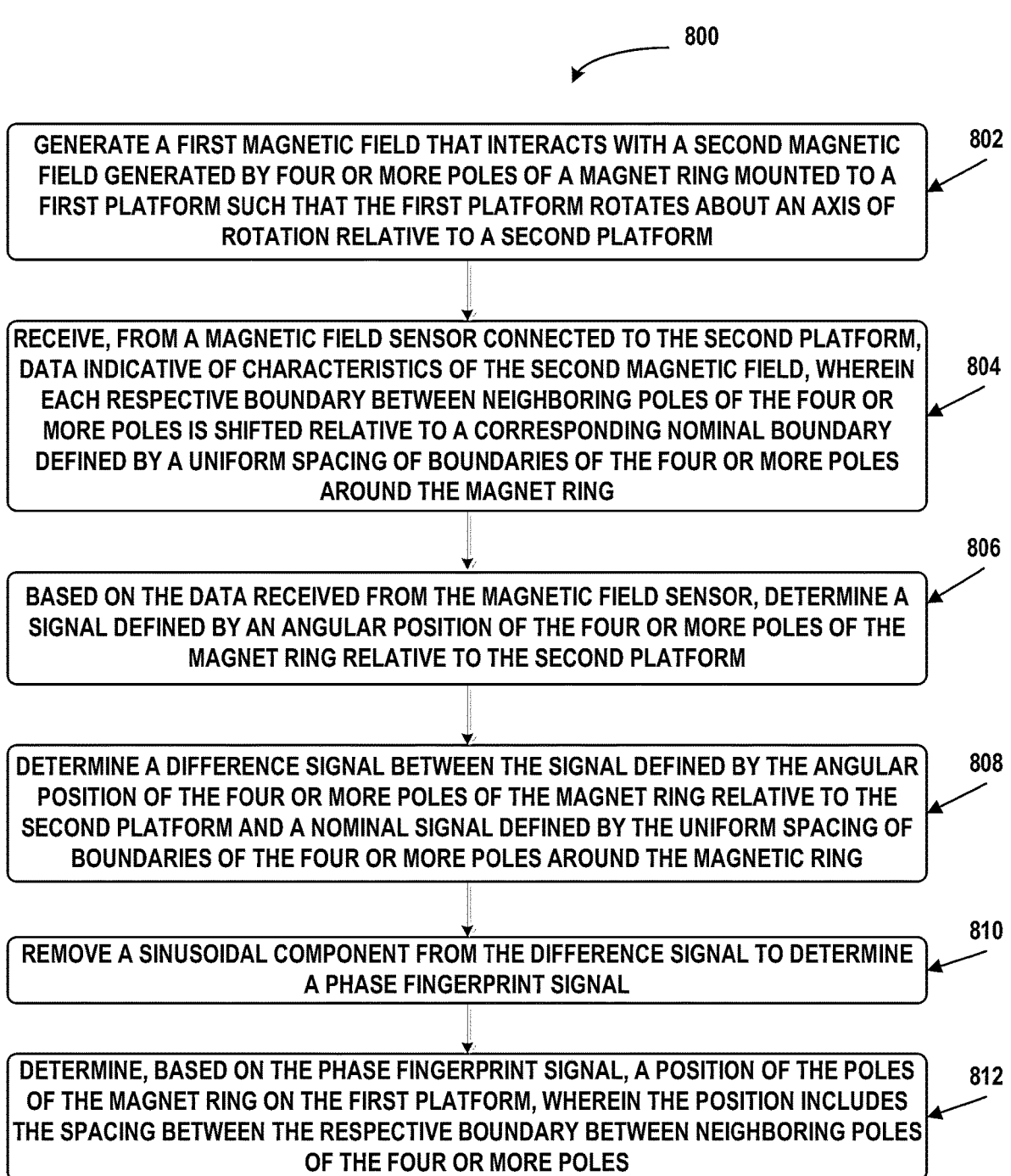
FIG. 8 illustrates a flow chart, in accordance with example embodiments.

FIG. 8 illustrates flow chart 800 of operations related to mitigating post-calibration error in a brushless DC motor. The operations may be used with any of devices 100 or 200, or magnet ring 300. The operations may be carried out by, for example, controller 114, controller 134, or circuitry that is configured to perform the operations.

Block 802 may involve generating a first magnetic field that interacts with a second magnetic field generated by four or more poles of a magnet ring mounted to a first platform such that the first platform rotates about an axis of rotation relative to a second platform.

Block 804 may involve receiving, from a magnetic field sensor connected to the second platform, data indicative of characteristics of the second magnetic field. Each respective boundary between neighboring poles of the four or more poles may be shifted relative to a corresponding nominal boundary defined by a substantially uniform spacing of boundaries of the four or more poles around the magnet ring.

Block 806 may involve, based on the data received from the magnetic field sensor, determining a signal defined by an angular position of the four or more poles of the magnet ring relative to the second platform. In some embodiments, the signal may be alternatively referred to as a measured signal.

Block 808 may involve determining a difference signal between the signal defined by the angular position of the four or more poles of the magnet ring relative to the second platform and a nominal signal defined by the substantially uniform spacing of boundaries of the four or more poles around the magnetic ring. The difference signal may be considered the offset between the measured signal indicating the location of the poles on the magnetic ring and the expected nominal signal indicating the location of the poles on the magnetic ring.

Block 810 may involve removing a sinusoidal component from the difference signal to determine a phase fingerprint signal. In an example embodiment, the difference signal may include a sinusoidal error component due to runout in the brushless DC motor. When experiencing runout, the distance between the magnetic field sensor and the poles on the magnet ring may fluctuate. Runout may be manifested in the signal gathered by the magnetic field sensor by a sinusoidal component. By removing the sinusoidal component, a more accurate difference between the measured and nominal signals can be determined. The difference could be represented by a phase shift. The phase shift may be used in determining the phase fingerprint signal.

Block 812 may involve determining, based on the phase fingerprint signal, a position of the poles of the magnet ring on the first platform, wherein the position includes the spacing between the respective boundaries between neighboring poles of the four or more poles. Because the phase fingerprint signal indicates the difference in measured versus nominal pole locations on the magnet ring, the specific location of the poles on the magnetic ring on the first platform can be more accurately determined.

An example embodiment may also include determining, based on the position of the poles of the magnet ring, a magnetic ring fingerprint, and determining, based on the fingerprint, spacing errors in the respective boundaries of the neighboring poles. Once the specific magnetic ring fingerprint is determined, it can be used to determine if the spacing of the magnetic ring is over a threshold amount different from the nominal spacing. If the threshold is exceeded, there may be an error in the spacing.

An example embodiment may also include that the data received from the magnetic field sensor comprises the transition between neighboring poles of the four or more poles. As the first platform rotates, the magnetic field sensors may detect when each pole on the magnetic ring passes the magnetic field sensor. The magnetic field sensor may also detect the transition based on the detected flux having a value of zero.

An example embodiment may include a plurality of magnetic field sensors, wherein the data indicative of characteristics of the second magnetic field are received from the plurality of magnetic field sensors. Each step in the operations previously described may then be completed for each of the respective magnetic field sensors. For example, the position of the poles of the magnet ring on the first platform may be calculated with each of the magnetic field sensors.

An example embodiment may include gathering, with the plurality of magnetic field sensors, magnetic field data generated by the second platform rotating relative to the first platform. The method may further include generating, based on the gathered magnetic field data, an array of angular positions of the four or more poles of the magnet ring relative to the first platform detected by each of the respective magnetic field sensors. By separating each element in the array, the operations may be performed on each element. An example embodiment may include separating the array of angular positions based on the respective magnetic field sensors. For each of the magnetic field sensors, the position of the poles of the magnet ring on the first platform may be determined.

An example embodiment may include comparing against each other the angular positions of the four or more poles of the magnet ring relative to the first platform for each of the respective magnetic field sensors. An example embodiment may further include, based on the comparison, determining an error in at least one of the magnetic field sensors. Each of the magnetic field sensors should have gathered data that indicates locations of the poles on the magnetic ring within a threshold distance of each other. However, if after comparing the data, one of the sensors detected the locations over a threshold distance different from the locations determined by the other sensors, there may be an error in the sensor.

VII. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
generating a first magnetic field that interacts with a second magnetic field, wherein the second magnetic field is generated by four or more poles of a magnet ring mounted to a first platform, and wherein the first platform and a second platform share a common axis;
receiving, from a magnetic field sensor connected to the second platform, data indicative of characteristics of the second magnetic field;
determining a measured signal based on an angular position of the four or more poles of the magnet ring relative to the second platform;
determining a difference signal between the measured signal and a nominal signal;
determining, based on the difference signal, a runout calibration factor; and
applying the runout calibration factor to the data received by the magnetic field sensor, wherein applying the runout calibration factor comprises subtracting a runout array containing values of the difference signal from a measured array containing values of the measured signal.

2. The method of claim 1, further comprising determining the measured signal based on data generated by the magnetic field sensor while the first platform rotates relative to the second platform.

3. The method of claim 2, wherein the data received from the magnetic field sensor comprises a transition between neighboring poles of the four or more poles.

4. The method of claim 3, wherein the measured signal further comprises an array of time stamps for each respective transition between neighboring poles.

5. The method of claim 1, further comprising determining the angular position of the four or more poles of the magnet ring relative to the second platform, wherein determining the angular position of the four or more poles of the magnet ring relative to the second platform comprises:
receiving, from the magnetic field sensor, time stamps when the magnetic field sensor detects the four or more poles of the magnet ring; and
converting each time stamp into respective angles using a constant velocity assumption.

6. The method of claim 5, further comprising determining an angular difference between the angular position of the four or more poles of the magnet ring relative to the second platform and a nominal angular position and wherein the angular difference further comprises a DC component and an AC component.

7. The method of claim 6, further comprising:
removing the DC component from the angular difference to determine an AC signal; and
graphing the AC signal.

8. The method of claim 1, further comprising graphing the difference signal and fitting the graph of the difference signal to a sinusoid.

9. The method of claim 1, wherein the measured signal comprises a measured magnetic field pattern based on data received by the magnetic field sensor.

10. The method of claim 9, wherein the difference signal comprises a phase shift between the measured signal and the nominal signal.

11. The method of claim 10, wherein the phase shift comprises a variation in phase in the measured magnetic field pattern versus a nominal magnetic field pattern.

12. A device comprising:
a magnet ring mounted to a first platform, wherein the magnet ring comprises four or more poles;
a plurality of magnetic field sensors connected to a second platform, wherein the first platform and the second platform share a common axis, and wherein the plurality of magnetic field sensors are configured to output signals used to generate a runout calibration factor associated with the device, wherein generating and applying the runout calibration factor associated with the device comprises:
generating a first magnetic field that interacts with a second magnetic field, wherein the second magnetic field is generated by the four or more poles of the magnet ring mounted to the first platform;
receiving, from the plurality of magnetic field sensors connected to the second platform, data indicative of characteristics of the second magnetic field;
determining a measured signal based on an angular position of the four or more poles of the magnet ring mounted to the first platform relative to the second platform;
determining a difference signal between the measured signal and a nominal signal;
determining, based on the difference signal, the runout calibration factor; and
applying the runout calibration factor to the data received by the plurality of magnetic field sensors, wherein applying the runout calibration factor comprises subtracting a runout array containing values of the difference signal from a measured array containing values of the measured signal.

13. The device of claim 12, wherein the plurality of magnetic field sensors are Hall effect sensors.

14. The device of claim 12, further comprising determining the measured signal based on data generated by the plurality of magnetic field sensors while the first platform rotates relative to the second platform, and wherein the data received from the plurality of magnetic field sensors comprises a transition between neighboring poles of the four or more poles.

15. The device of claim 14, wherein the measured signal further comprises an array of time stamps for each respective transition between neighboring poles.

16. The device of claim 12, further comprising determining the angular position of the four or more poles of the magnet ring relative to the second platform, wherein determining the angular position of the four or more poles of the magnet ring relative to the second platform comprises:

receiving, from the plurality of magnetic field sensors, time stamps when the plurality of magnetic field sensors detect the four or more poles of the magnet ring; and converting each time stamp into respective angles using a constant velocity assumption.

17. The device of claim 16, further comprising determining an angular difference between the angular position of the four or more poles of the magnet ring relative to the second platform and a nominal angular position and wherein the angular difference further comprises a DC component and an AC component.

18. The device of claim 17, further comprising:

removing the DC component from the angular difference to determine an AC signal; and graphing the AC signal.

19. The device of claim 12, further comprising graphing the difference signal and fitting the graph of the difference signal to a sinusoid.

20. The device of claim 12, wherein the measured signal comprises a measured magnetic field pattern based on data received by the plurality of magnetic field sensors, wherein the difference signal comprises a phase shift between the measured signal and the nominal signal, and wherein the phase shift comprises a variation in phase in the measured magnetic field pattern versus a nominal magnetic field pattern.

* * * * *